United States Patent [19]
Ensley et al.

[11] Patent Number: 5,510,033
[45] Date of Patent: Apr. 23, 1996

[54] ELECTROKINETIC TRANSPORT OF MICROORGANISMS IN SITU FOR DEGRADING CONTAMINANTS

[75] Inventors: Burt D. Ensley, Newton, Pa.; Mary F. DeFlaun, Hamilton Twp., N.J.

[73] Assignee: Envirogen, Inc., Lawrenceville, N.J.

[21] Appl. No.: 350,500

[22] Filed: Dec. 6, 1994

Related U.S. Application Data

[63] Continuation of Ser. No. 978,540, Nov. 19, 1992, abandoned.

[51] Int. Cl.$^6$ .................................. C02F 3/34; B09B 1/00
[52] U.S. Cl. ......................... 210/611; 210/747; 210/748; 210/908; 166/248; 204/450; 204/554; 435/173.1
[58] Field of Search ........................ 210/610, 611, 210/631, 747, 748, 908, 909; 204/181.9, 182.2, 183.3, 188, 186; 166/248

[56] References Cited

U.S. PATENT DOCUMENTS

| | | | |
|---|---|---|---|
| 4,119,511 | 10/1978 | Christenson | 204/180 R |
| 4,305,800 | 12/1981 | Christenson | 204/180 R |
| 4,550,779 | 11/1985 | Zakiewicz | 166/248 |
| 4,681,851 | 7/1987 | Baumgarten et al. | 435/262 |
| 4,859,594 | 8/1989 | Portier | 435/172.1 |
| 5,137,608 | 8/1992 | Acar et al. | 204/130 |
| 5,299,887 | 4/1994 | Ensley | 210/747 |
| 5,348,658 | 9/1994 | Fuchs et al. | 210/748 |
| 5,398,757 | 3/1995 | Conte et al. | 210/747 |

OTHER PUBLICATIONS

Iske, U. et al., "Investigation of the Connection between the Electrophoretic Mobility (EPM) of Microorganisms and their Capability of Metal Uptake", Acta Biotechnical. 10 (1990) 6, pp. 541–549.

Kozak, M. W. et al., "Fundamentals of Electrokinetics", presented at the DOE National Electrokinetic Workshop Atlanta, Jan. 22–23, 1992.

Bayer, M. E. et al., "The electrophoretic mobility of Gram-negative and Gram-positive bacteria: an electrokine[001d]tic analysis", Journal of General Microbiology (1990), 136, pp. 867–874.

Loosdrecht, M. C. et al., "Electrophoretic Mobility and Hydrophobicity as a Measure to Predict the Initial Steps of Bacterial Adhesion", Applied and Environmental Microbiology, Aug. 1987, pp. 1898–1901.

Mafu, A. A., et al., "Characterization of Physiochemical Forces Involved in Adhesion of Listeria monocytogenes to Surfaces," Appl. Environ. Microbiol. vol. 57, No. 7, Jul. 1991, pp. 1969–1973.

Shapiro, A. P., et al., "Preliminary Studies on the Removal of Chemical Species from Saturated Porus Media by Electroosmosis," PhysicoChemical Hydrodynamics vol. 11, No. 5/6, pp. 785–802, 1989.

Dickson, J. S. et al., "Cell Surface Charge Characteristics and Their Relationship to Bacterial Attachment to Meat Surfaces", Applied and Environmental Microbiology, Apr. 1989, vol. 55, No. 4, pp. 832–836.

Probstein, R. F., "Electroosmotic Purging For In Situ Remediation" Proceedings of the Electrokinetics Workshop, Jan. 22–23, Atlanta, GA. Office of R & D, U.S. Department of Energy.

Kelsh, Dennis, "Technical Requirements for Electrokinetics Development".

Gannon, J., et al., "Effect of Sodium Chloride on Transport of Bacteria in a Saturated Aquifer Material", Applied and Environmental Microbiology, Sep. 1991, vol. 57, No. 9, pp. 2497–2501.

Reynolds, P. J., et al., "Mechanisms of Microbial Movement in Sub-surface Materials", Applied and Environmental Microbiology, Sep. 1989, vol. 55, No. 9, pp. 2280–2286.

(List continued on next page.)

*Primary Examiner*—Thomas Wyse

[57] ABSTRACT

The method and apparatus of the present invention feature the use of and electric current to induce movement of bacteria in situ to degrade contaminants in aquifers.

12 Claims, 1 Drawing Sheet

OTHER PUBLICATIONS

Lindgren, E. R. et al., "Electrokinetic Remediation of Contaminated Soils", Presented at: Environmental Remediation '91, Sep. 8–11, 1991, Pasco, Washington.

Lindgren, E. R., et al., "Electrokinetic Remediation of Contaminated Soils: An Update", Presented at: Waste Management '92, Mar. 1–5, 1992, Tucson, Arizona.

Ksenzhek, O. S., et al., "Effect of an Electric Field on Alcaligenes eutropha Cells".

Fox, B. G., et al., "[31]Methane Monooxygenase from Methylosinus trichosporium OB3b", Methods in Enzymology, vol. 188, pp. 191–202.

Shapiro et al., "Removal of Contaminants from Saturated Clay by Electroosmosis", Environ. Sci. Technol., vol. 27 No. 2, 1993, pp. 283–291.

ELECTROKINETIC TRANSPORT OF MICROORGANISMS IN SITU FOR DEGRADING CONTAMINANTS

This application is a continuation, of application Ser. No. 07/978,540, filed Nov. 19, 1992, now abandoned.

FIELD OF THE INVENTION

The present invention relates generally to methods and apparatus which feature electrokinetic transport of microorganisms through an aquifer. Embodiments of the present invention have application for the removal of contaminants from aquifer solids.

BACKGROUND OF THE INVENTION

The removal of contaminants from aquifers has met with limited success. One method presently used to treat contaminated aquifers is a pump and treat process. In a pump and treat process, contaminated ground water is brought to the surface for treatment and returned to the aquifer. However, large amounts of contaminants remain adsorbed onto aquifer solids.

The contaminants adsorbed onto aquifer solids slowly leach into the aquifer, recontaminating the aquifer. Continuous treatment of the aquifer during the slow leaching process is costly and impractical.

The treatment of contaminants adsorbed onto aquifer solids in situ by remediation with microorganisms has been limited. Microorganisms introduced to a site by injection can migrate on their own or in response to natural or imposed hydrogeological gradients. Movement by diffusion is slow. Movement imposed by hydrogeological gradients is nonuniform and multidirectional.

The movement of microorganisms through the aquifer is often blocked by nonuniform aquifer physical structures or features. Natural hydrogeological gradients frequently do not run in the direction of the plume of the contamination.

Thus, in situ treatment of aquifer solids with microorganisms has been limited due to the low frequency of contact of the microorganism with the targeted contaminated surfaces.

SUMMARY OF THE INVENTION

The present invention features a method and apparatus for removing one or more chemicals adsorbed to aquifer solids. The method comprises the step of imposing a direct current in an aquifer. The current imparts movement to the microorganisms to direct the microorganisms through the aquifer. The microorganisms degrade contaminating chemicals adsorbed to the solids of the aquifer as the microorganisms move through the aquifer.

Typical contaminants of aquifers include organic molecules and halogenated organic molecules. Examples of halogenated hydrocarbons are, by way of example without limitation, trichloroethylene (TCE), vinyl chloride, dichloroethylene (DCE), chloromethane, dichloromethane, 1,1,2-trichloroethane, chloroform, 1,1-dichloroethane, 1,2-dichloroethane, cis-1,2-dichloroethylene, trans-1,2-dichloroethylene, 1,2-dibromoethane, and other related compounds.

Three typical contaminants exhibit strong affinity for solids in the aquifer. The contaminants are not necessarily distributed evenly through the aquifer. Contaminants may be trapped in areas in which the actual flow of ground water is restricted.

Embodiments of the present method feature the movement of microorganisms with direct current. Microorganisms can be directed to the site of contaminants held adsorbed to aquifer solids.

The microorganisms are endogeneous or are introduced by injection or other means into the aquifer. Preferably, the microorganisms exhibit low adhesion to aquifer solids allowing the microorganisms to more readily move through the aquifer in response to the direct current.

Preferred microorganisms comprise bacteria. Most bacteria have a net negative charge. Preferred bacterial strains comprise *Methylosinus trichosporium* OB3b, *Pseudomonas cepacia* and *Pseudomonas mendocina*. The movement of bacteria through the aquifer can be optimized by controlling the pH of the aquifer and salt concentrations.

One embodiment of the present method features electrodes capable of imposing an electric current on the aquifer. Preferred compositions for the electrode comprise, by way of example without limitation, carbon and graphite electrodes. Electrode compositions of carbon or graphite are resistant to corrosion.

An electric current of 10 milliamps is capable of propelling microorganisms at rates of up to 0.6 meters a day in laboratory scale equipment.

A further embodiment of the present invention features an apparatus for removing chemical contaminants from aquifers. The apparatus is comprised of means for injecting microorganisms and an electric power supply. Means for injecting microorganisms are apparatus and devices adapted to introduce microorganisms into an aquifer. The microorganisms are capable of degrading the chemical contaminant. The electric power supply is capable of imposing an electrical current in the aquifer which current imparts movement to the microorganisms to direct the microorganisms through the aquifer. The microorganisms degrade the chemical contaminant as the microorganisms move through the aquifer.

A preferred embodiment of the present invention features at least two electrodes. A preferred current is greater than 10 milliamps.

Preferably, the electrode is comprised of graphite or carbon. Graphite and carbon are corrosion resistant materials.

A preferred means for injecting microorganisms into the aquifer is an injection well. The injection well may also introduce nutrients, salts and hydrogen ions into the aquifer. Salts and hydrogen ions optimize pH and the ionic strength of the ground water for growth and the movement of microorganisms.

To impart an electric current in an aqueous media, two electrodes, a positive electrode and a negative electrode, are required. One embodiment of the present invention features an injection well which acts as a negative electrode. Preferably, the injection well and positive electrode are positioned in spaced arrangement spanning a contaminated region of the aquifer. Imposition of an electric current on the aquifer compels the microorganisms to travel across the contaminated area of the aquifer.

The injection well may be vertically positioned opposite one or more vertically oriented electrodes or the injection well may be horizontally positioned under or over one or more electrodes. Individuals skilled in the art will readily recognize that a plurality of positive electrodes can be used to impart movement of microorganisms anywhere within the three dimensional structure of the aquifer.

Features of the present method and apparatus are ideally suited for treating halogenated hydrocarbons adsorbed to aquifer solids in situ. Absorbed contaminants are capable of slowly leaching into the aquifer even after the aquifer ground water has been treated. The present invention features the use of microorganisms, which microorganisms are moved by electric current to the contaminant adsorbed to solids in the aquifer. Ground water and solids are not pumped, extracted or treated apart from where the ground water and solids are naturally situated, resulting in substantial saving of time and expense.

These and other features will become apparent from the drawings and the detailed discussion which follow which, by way of example, without limitation, describes preferred embodiments of the present invention.

DETAILED DESCRIPTION OF THE DRAWINGS

Figure 1:
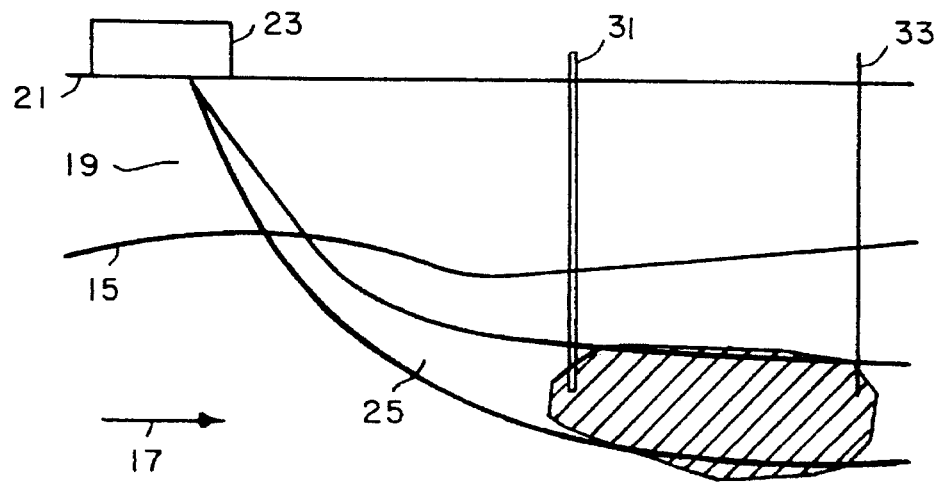
FIG. 1 depicts a cross-section of an aquifer having a plume of contamination being treated with methods and apparatus embodying the invention.

The present method and apparatus will be discussed with respect to an aquifer, contaminated with one or more chemicals such as halogenated hydrocarbons. Examples of halogenated hydrocarbons are trichloroethylene (TCE), vinyl chloride, dichloroethylene (DCE), chloromethane, dichloromethane, 1,1,2-trichloroethane, chloroform, 1,1-dichloroethane, 1,2-dichloroethane, cis-1,2-dichloroethylene, trans-1,2-dichloroethylene, 1,2-dibromoethane, and other related compounds. Turning now to FIG. 1, a cross-section of an aquifer is depicted. The aquifer has a water table 15 having ground water flowing in the direction of arrow 17. Above the water table is a valdose zone 19 and the ground surface 21.

Storage tank 23, a source of contamination contains halogenated hydrocarbons. The source of contamination may comprise any means for introducing contaminants into the aquifer, such as dumping, manufacturing processes, and the like. As illustrated, tank 23 has leaked halogenated hydrocarbons, creating a plume of contamination, generally represented by the numeral 25. The halogenated hydrocarbons adhere to the solids of the aquifer creating a long-term contamination problem.

An apparatus of the present invention comprises two major elements: an electrically charged injection well 31 and an oppositely charged electrode 33. Microorganisms capable of degrading the halogenated hydrocarbons are injected into the plume of contamination by injection well 31. The microorganisms have a net negative charge.

Electrode 33 is placed into the plume of contamination at a site distal to the injection site. Electrode 33 is made of any conductive material, but may be carbon or graphite. Electrodes of carbon and graphite are more resistant to corrosion.

Electrode 33 has a net positive charge and injection well 31 has a net negative charge. The respective charges create an electric current in the aquifer. The negatively charged microorganisms are drawn to the positive electrode 33. Multiple electrodes 33 may be used to create an electric field capable of directing microorganisms to a plurality of areas of the plume 25. Preferably, electrode 33 and injection well 31, create an electric current of 10 or more milliamps.

As the microorganisms move through the aquifer, the microorganisms contact and degrade halogenated hydrocarbons adsorbed to aquifer solids.

Microorganisms which are known to degrade halogenated hydrocarbons include *Methylosinus tricosporium* OB3b, *Pseudomonas mendocina*, and *Pseudomonas cepacia*.

Preferably, the microorganisms are selected for minimal adhesion to aquifer solids to allow the microorganism to move more readily through the aquifer.

Nutrients, hydrogen ions, and salts are placed in the aquifer with the microorganisms, by injection well 31. The nutrients, hydrogen ion and salts facilitate the growth of the microorganisms and metabolism of the halogenated hydrocarbons by the microorganism.

At neutral or alkaline pH, the surface of bacterial cells carry a net negative charge. The degree of this charge varies widely depending on the species. The electrokinetic mobility of a cell is a measure of the charge distribution on the outer membrane based on the cell's velocity toward the positive pole in an electric field. The greater the velocity of the cell, the more electronegative is its surface. The electronegativity of the cell surface can be manipulated by changing the pH and ionic strength of the conducting medium. Under model aquifer conditions, bacteria can move 0.6 meters per day.

In operation, microorganisms, buffers and salt pass through injection well 31 into the plume of contamination 25 of the aquifer. The microorganisms bear a net negative charge. A positive electric charge is placed on electrode 33 and a negative electric charge is placed on injection well 31, creating an electric current. The electric current propels the microorganisms through the remedial zone generally designed by the numeral 35.

Other features will be apparent from the examples set forth below.

Materials

A small scale model aquifer was constructed in a horizontal submarine electrophoresis apparatus by filling the gel tray with sterile Ottawa sand standard (20 to 30 mesh size). The reservoirs were filled with TB (0.089M trishydroxylaminomethane, 0.089M boric acid pH 8.0) to the level of the sand so that it was saturated, but not submerged. Electrodes were attached at either end and a current of 35 to 100 volts (5 to 20 milliamps) was run through the sand 'aquifer'.

EXAMPLE 1

Cells from an overnight culture of bacteria were introduced in a small volume (10 to 20 µl) to the center of the sand bed and the electric current at 35 to 50 volts was run for 2 to 4 hours. One gram sand samples were then taken from the negative pole, the middle of the gel tray and the positive pole. Each sand sample was mixed rapidly by vortex for one minute and the supernatant was serially diluted for colony plate counts to determine the number of cells.

Three different bacterial strains; a non-motile *Pseudomonas fluorescens* (PfO-5), an *E. coli* (JM83, Kmr), and a *Pseudomonas cepacia*, exhibited unidirectional movement towards the positive electrode. This movement is surprising and unexpected. The art has not recognized that bacteria can be moved in an aquifer environment. The art would suggest that bacteria adhere to aquifer solids and are not particularly mobile.

Figure 2:
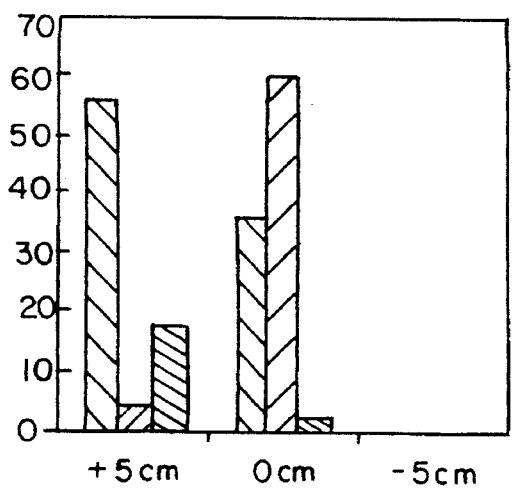
FIG. 2 graphically represents electrokinetic movement of bacteria through sand towards a positive electrode.

The movement of the bacteria to the positive electrode is depicted graphically in FIG. 2. The solid bar represents the movement of *E. coli* JM83 at 50 volts for four hours. The lined bar represents the movement of *Pseudomonas cepacia* at 35 volts for two hours. The dotted bar represents *Pseudomonas fluorescens* (PfO-5) at 40 volts for four hours.

EXAMPLE 2

The rate of movement of the bacteria through the model aquifer was determined. A small volume (10 to 20 μl) of an overnight culture of *E. coli* (w 3110) was introduced at the negative end of the sand bed samples of the interstitial buffer were taken every half hour at the positive end of the sand bed 6 cm away. Each sample was 100 μl. Each sample was diluted and plated on the appropriate media for colony counts.

Figure 3:
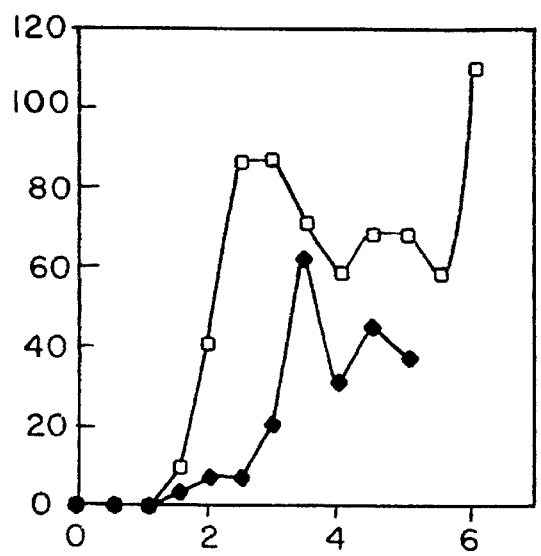
FIG. 3 graphically illustrates electrokinetic movement of bacteria through a model aquifer at 50 volts and 100 volts measured 6 centimeters from the point of injection.

At 50 volts the major peak of bacteria passed the 6 cm point at 3.5 h. A second peak of bacteria passed at 4.5 h. This same type of pattern was seen when the *E. coli* (w3110) were subjected to 100 volts. A major peak of bacteria passed at 2.5 h and a second peak of bacteria passed at 3.5 h. The results are graphically illustrated in FIG. 3. In FIG. 3, the filled diamonds represent *E. coli* (W3110) at 50 volts. The open squares represent *E. coli* (W3110) at 100 volts.

The rate of movement, 2.4 cm/h, which is greater than 0.5 m/day, measured in the model aquifer is 8 times the fastest rate measured for motile bacteria passing through unconsolidated sand cores (Reynolds, P. J., P. Sharma, G. E. Jenneman and M. J. MacInerny, "Mechanisms of microbial movement in subsurface materials," *Appl. Environ. Microbiol.* 55:2280–2286 (1989)). In addition to enhancing the rate of movement, the electric field can also provide directionality to the bacteria being moved through the aquifer. Bacteria will move towards the positive electrode even if movement is tangential to the direction of the flow in the aquifer. In this way transport of the bacteria is no longer passively dictated by the speed and direction of the ground water flow.

Chemical analysis of the TCE contaminated sand following passage of the microorganisms will suggest that TCE has been degraded.

Thus, while preferred embodiments of the invention have been described, the present invention is capable of variation and modification and, therefore, the present invention should not be limited to the precise details set forth, but should include such changes and alterations as fall within the purview of the following claims.

What is claimed is:

1. A method of removing one or more chemicals from aquifer solids comprising the steps of imposing an electric current on an aquifer, said aquifer having one or more chemicals associated with aquifer solids in a first area of said aquifer said aquifer having one or more microorganisms capable of degrading said one or more chemicals said one or more microorganisms having position in a second area of said aquifer, said one or more microorganisms capable of degrading said one or more chemicals and said electric current capable of imparting movement on said one or more microorganisms to move said one or more microorganisms from a second area to said first area to degrade said one or more chemicals.

2. The method of claim 1 wherein the microorganisms have a net negative charge.

3. The method of claim 1 wherein said current flows through an electrode.

4. The method of claim 1 wherein said current is 10 or more milliamps.

5. The method of claim 4 wherein said electrode is carbon or graphite.

6. The method of claim 1 wherein said microorganisms show reduced adhesion properties to aquifer solids.

7. The method of claim 1 wherein said microorganisms are selected from the group of microorganisms consisting essentially of *Methylosinus trichosporium, Pseudomonas cepacia*, and *Pseudomonas mendocina*.

8. The method of claim 1 wherein said chemical is a halogenated hydrocarbon.

9. The method of claim 8 wherein said halogenated hydrocarbon is trichloroethylene, vinyl chloride, dichloroethylene and other related chemicals.

10. The method of claim 1 wherein said one or more microorganisms move up 0.6 meter per day.

11. The method of claim 1 wherein said one or more microorganisms are indigenous to the aquifer.

12. The method of claim 1 wherein said microorganisms are injected into said aquifer.

\* \* \* \* \*